(12) United States Patent
Walker, Jr.

(10) Patent No.: US 7,176,247 B1
(45) Date of Patent: Feb. 13, 2007

(54) INTERPENETRATING POLYMER NETWORK

(75) Inventor: Charles W. Walker, Jr., Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 144 days.

(21) Appl. No.: 10/607,012

(22) Filed: Jun. 27, 2003

(51) Int. Cl.
*C08L 43/02* (2006.01)

(52) U.S. Cl. ............... 521/140; 521/142; 521/150; 521/146; 521/149; 521/186

(58) Field of Classification Search ............. 521/150, 521/102, 109.1, 121, 125, 128, 130, 140, 521/142, 146, 149, 182, 183, 186
See application file for complete search history.

(56) References Cited

U.S. PATENT DOCUMENTS

| | | | | |
|---|---|---|---|---|
| 4,664,757 | A | 5/1987 | Zupancic et al. | 204/1 T |
| 5,795,496 | A | 8/1998 | Yen et al. | 252/62.2 |
| 6,271,278 | B1 * | 8/2001 | Park et al. | 521/150 |
| 6,523,699 | B1 | 2/2003 | Akita et al. | 210/490 |
| 2001/0038937 | A1 | 11/2001 | Suzuki et al. | 429/33 |
| 2002/0127474 | A1 | 9/2002 | Fleischer et al. | 429/309 |

OTHER PUBLICATIONS

Walker, Journal of Power Sources, vol. 110 pp. 144-151 (2002).*
Homma et al., Journal of Applied Polymer Science, vol. 75, pp. 111-118 (2000) (hereinafter "Homma").*
Hong Wu, Yuxin Wang and Shichang Wang. "A methanol barrier polymer electrolyte membrane in direct methanol fuel cells" Journal of New Materials for Electrochemical Systems 5, 251-254 (2002).
Charles W. Walker Jr. "Proton-conducting polymer membrane comprised of a copolymer of 2-acrylamido-2-methylpropanesulfonic acid and 2-hydroxyethyl methacrylate" Journal of Power Sources 110 (2002) 144-151.
Jean-Paul Randin "Ion-Containing Polymers as Semisolid Electrolytes in WO3-Based Electrochromic Devices" J. Electrochem. Soc. 129:6 (1982) 1215-1220.
J.M. Calvert, T.J. Manuccia and R.J. Nowak. "A Polymeric Solid-State Electrochromic Cell" J. Electrochem. Soc. 133:5 (1986) 951-953.
Kuo-Chuan Ho, Thomas G. Rukavina and Charles B. Greenberg. "Tungsten Oxide-Prussian Blue Electrochromic System Based on a Proton-Conducting Polymer Electrolyte" J. Electrochem. Soc. 141:8 (1994) 2061-2067.
Marie-Claude Bernard, Anne Hugot-Le Goff and Wen Zeng. "Elaboration and study of a PANI/PAMPS/WO3 all solid-state electrochromic device" Electrochemica Acta 44 (1998) 781-796.
W.S. Dai and T.A. Barbari. "Hydrogel membranes with mesh size asymmetry based on the gradient crosslinking of poly(vinyl alcohol)" J. Membrane Sci. 156 (1999) 67-79.

* cited by examiner

*Primary Examiner*—Robert D. Harlan
(74) *Attorney, Agent, or Firm*—William Randolph

(57) ABSTRACT

A water insoluble interpenetrating polymer network is obtained by independently cross-linking a first polymer derived from a sulfonic acid or phosphonic acid group containing alkenyl monomer and a second polymer polymerized independently of the first polymer and interpenetrating the first polymer, where the second polymer is selectively permeable to water compared to methanol. Through adjustment of the degree of first polymer monomer acidification, polymer ratios and the extent of cross-linking in the at least two interpenetrating polymers, ion conductivity and solvent permeability are controlled. A film produced from such a water insoluble interpenetrating polymer network is well suited as a membrane in a direct methanol fuel cell. The relative degree and mechanism of cross-linking and interpenetrating the first polymer and second polymer are also adjustable parameters that impact on film properties.

27 Claims, 3 Drawing Sheets

INTERPENETRATING POLYMER NETWORK

GOVERNMENT INTEREST

The invention described herein may be manufactured, used, and licensed by or for the United States Government.

FIELD OF THE INVENTION

The present invention generally relates to an interpenetrating polymer network and in particular relates to polymer electrolyte membranes well suited for use in a direct methanol fuel cell.

BACKGROUND OF THE INVENTION

Fuel cells are considered as direct replacements for batteries in many portable devices and as power supplies for recharging batteries, power for silent watch and remotely-placed sensors, and for use in robotics and electric vehicles. A fuel cell can provide uninterrupted power so long as the fuel is continuously supplied. The process involves the conversion of chemical energy in the form of hydrogen and oxygen directly to electricity, heat and water.

Polymer electrolyte membrane fuel cell (PEMFC) technology has exceptional promise owing to light weight, high power, low operating temperature and fast start up. Hydrogen is oxidized at the anode to produce electricity and hydrogen ions that migrate through the polymer electrolyte membrane to the cathode. The hydrogen ions combine with oxygen that is reduced at the cathode to produce water. Although the preferred fuel is hydrogen, difficulties remain with its safe storage, transport and handling in an economical and light weight system. An alternative to hydrogen gas is to reform liquid fuels such as alcohols, gasoline and diesel fuel, or compressed gases such as butane and ammonia to produce hydrogen, yet this adds to system weight and complexity.

A direct methanol fuel cell (DMFC) catalyzes the oxidation of methanol at the anode catalyst in close proximity to the polymer electrolyte membrane (PEM) absent a separate reforming process to produce electricity and hydrogen ions. Protons that are produced as a result of methanol oxidation diffuse from the anode through the hydrated PEM to the cathode, where oxygen is reduced and is combined with the protons to form water. Incomplete methanol oxidation leads to methanol also permeating through the PEM to the cathode catalyst. This not only reduces fuel efficiency but also permits methanol to react at the cathode thereby reducing cell performance. The PEM must contain and be permeable to water for good proton conductivity. Conditions suitable for diffusion of protons and water often also allow for diffusion of methanol. A conductive membrane that is selective by being more permeable to water than to methanol increases fuel cell performance and fuel efficiency by keeping methanol on the anode side of the membrane.

A conventional DMFC PEM is a perfluorosulfonic acid ionomer sold under the trade name Nafion® 117 (DuPont). Although Nafion® is a fairly good proton conductor, cost and poor methanol barrier properties have affected the acceptance of this material. The ionic conductivity of Nafion® is due to the ionization of hydrated sulfonic acid groups that result in solvated protons. Conductivity is generally reported to be in the range of 0.08 to 0.1 Siemen (S) cm$^{-1}$, but the extent of membrane hydration is a critical factor in determining conductivity. Conductivity increases with water content, but at temperatures exceeding 100° C. it decreases as water is lost. A DMFC typically operates at temperatures ranging from 60° C. to 80° C., with self-heating generated by methanol oxidation, and airflow at the cathode may tend to dehydrate the Nafion® membrane thereby decreasing proton conductivity. Thus, there exists a need for a membrane that adsorbs and maintains significant amounts of water to improve ionic conductivity and stabilize cell operating performance, while being less permeable to methanol than conventional membranes.

SUMMARY OF THE INVENTION

A water insoluble interpenetrating polymer network includes a first polymer that contains a monomer having a sulfonic acid or a phosphonic acid group monomer and a second polymer polymerized independently of the first polymer. The first polymer is derived from a monomer having the structure

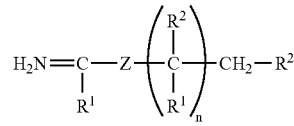

where $R^1$ is independently in each occurrence H, $C_1$–$C_4$ alkyl, $C_1$–$C_4$ hydroxy alkyl, Cl or Br; Z is a nullity, O, $C(O)NR^3$ or $C(O)$; $R^2$ is independently in each occurrence H, $C_1$–$C_4$ alkyl, $C_1$–$C_4$ hydroxy alkyl, $C_0$–$C_4$ $SO_3M$ or $C_0$–$C_4$ $PO_2H_2$; $R^3$ is H, $C_1$–$C_4$ alkyl, $C_1$–$C_4$ hydroxy alkyl, where M is H, Li, Na, K, Zn, Mg, Ca, Ba, Sr, Cs and Al; n is an integer from 1 to 5, inclusive, with the proviso that adjacent carbon atoms lack sulfonic and/or phosphonic acid groups and at least one sulfonic acid or phosphonic acid group is present in the structure. The second polymer interpenetrates the first polymer and is characterized as being more permeable to water than methanol.

A film produced from such an interpenetrating polymer network is well suited as a membrane in a direct methanol fuel cell. As a fuel cell component, the first polymer component of an inventive interpenetrating polymer network provides proton conductivity to the film, and the second polymer assures film hydration and greater permeability to water than organic solvent.

A process for forming an interpenetrating polymer network includes the step of mixing a solution containing polyvinyl alcohol with a first polymer monomer containing a sulfonic acid or phosphonic acid group therein. The first polymer monomer is then induced to cross-link under free radical polymerization conditions. The polyvinyl alcohol is induced to cross-link through a condensation reaction. While the order of polyvinyl alcohol cross-linking and first polymer monomer polymerization is readily interposed, the result is an interpenetrating polymer network having properties associated with the identity, polymer ratio and extent of cross-linking in the polyvinyl alcohol and first polymer portions of the network.

Figure 2:
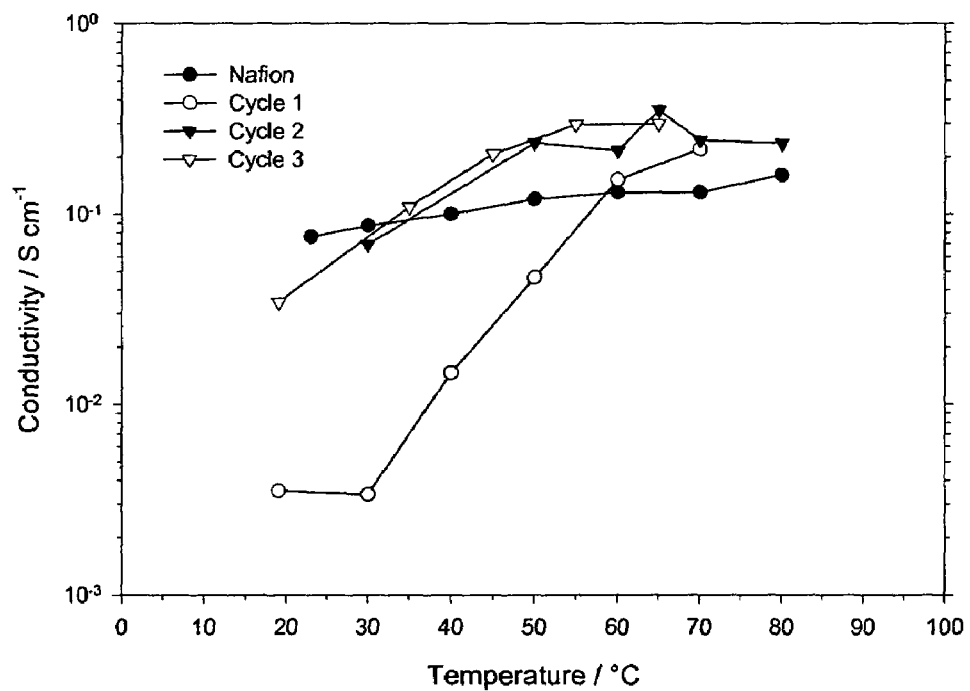
Figure 3:
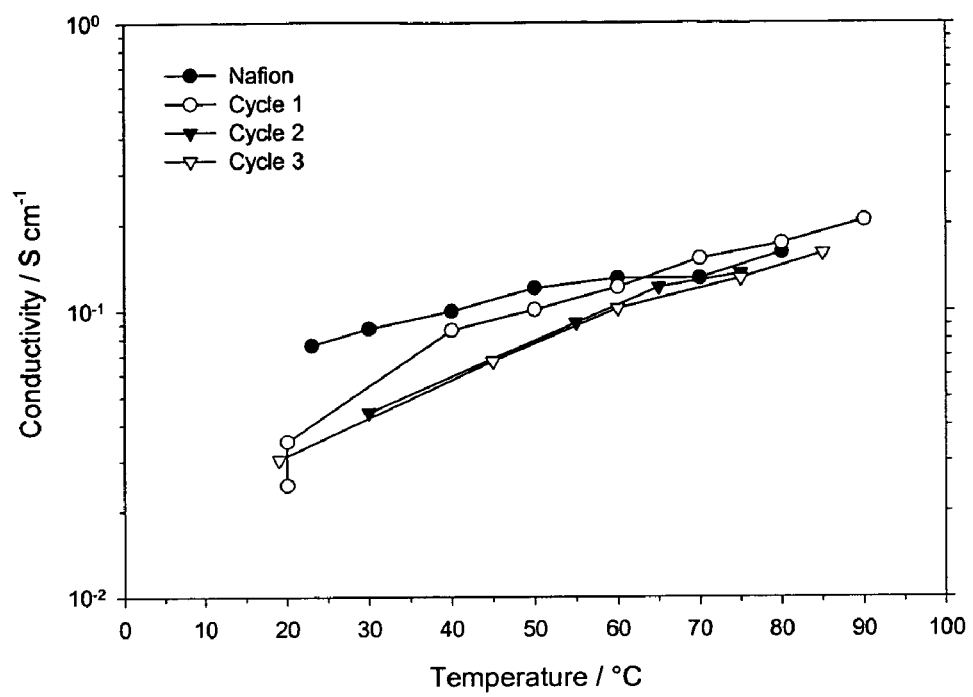
Figure 4:
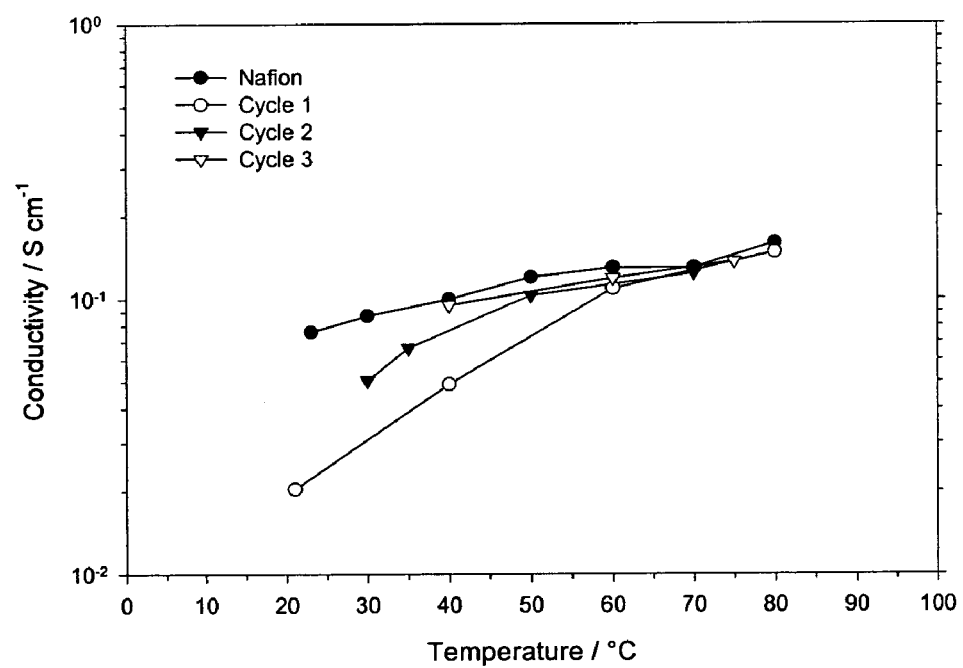
Figure 5:
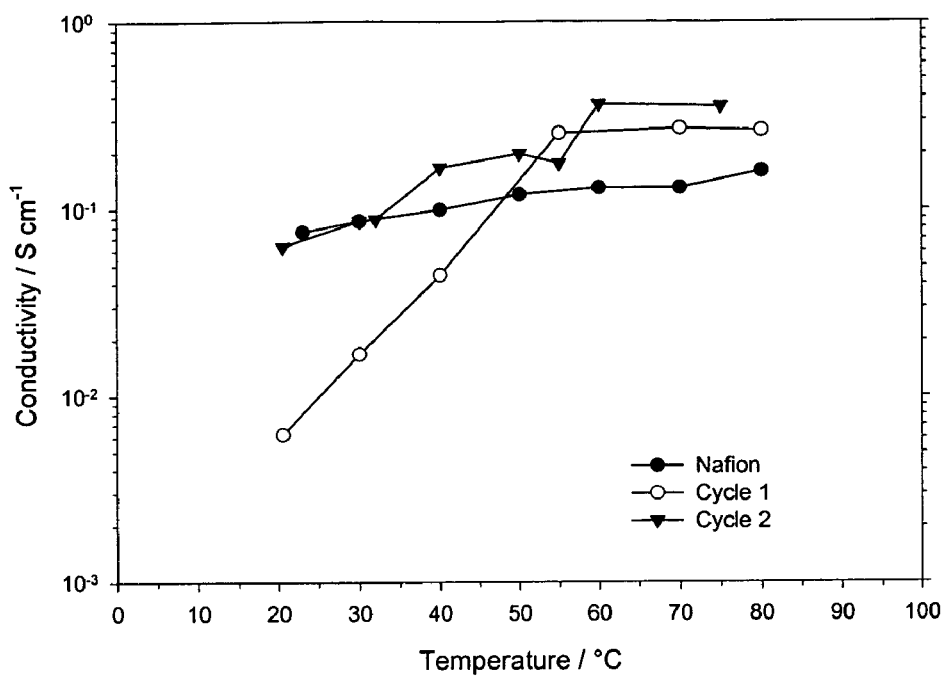
Figure 6:
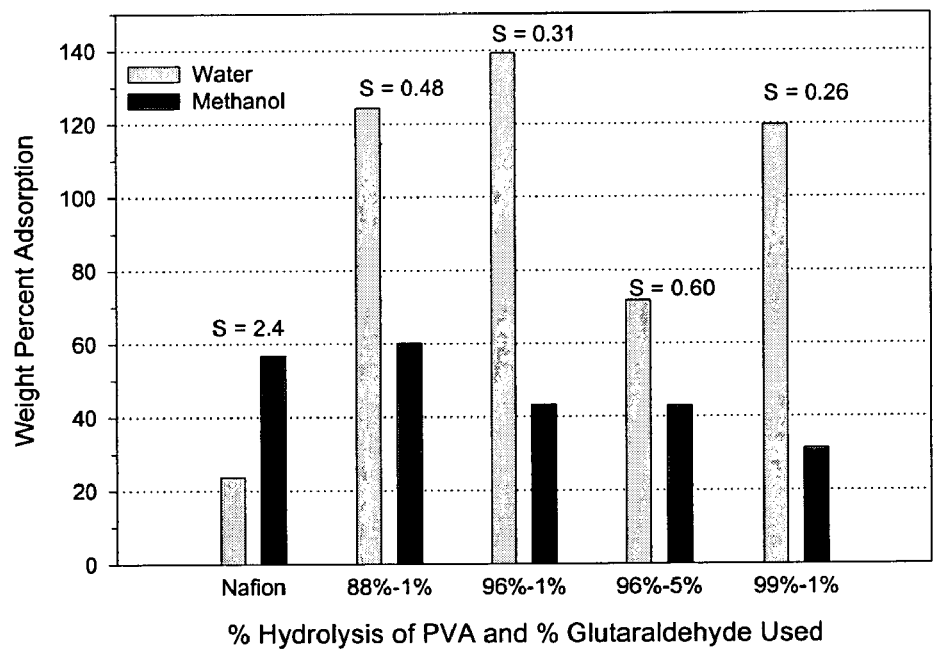

75% PVA (96% hydrolyzed) cross-linked at 70° C. then with a 1% glutaraldehyde (○) compared with Nafion® 117 (●);

FIG. 2 is a plot of conductivity as a function of temperature for three heating cycles for 4% AMPS—21% HEMA—75% PVA (88% hydrolyzed) cross-linked at 70° C. then with 1% glutaraldehyde;

FIG. 3 is a plot of conductivity as a function of temperature for three heating cycles for 4.6% AMPS—39.6% HEMA—55.8% PVA (96% hydrolyzed) cross-linked at 70° C. then with 1% glutaraldehyde;

FIG. 4 is a plot of conductivity as a function of temperature for three heating cycles for 10% AMPS—20% HEMA—70% PVA (96% hydrolyzed) cross-linked at 70° C. then with 1% glutaraldehyde;

FIG. 5 is a plot of conductivity as a function of temperature for two heating cycles for 4% AMPS—72% HEMA—24% PVA (96% hydrolyzed) cross-linked at 70° C. then with 1% glutaraldehyde; and FIG. 6 is a plot of liquid adsorption (weight %) and selectivity for methanol (S) for 4% AMPS—21% HEMA—75% PVA cross-linked at 70° C. then with glutaraldehyde, with varying degrees of % hydrolysis of PVA and either 1% or 5% glutaraldehyde used for cross-linking PVA, where S=wt % MeOH adsorbed divided by wt % $H_2O$ adsorbed.

DESCRIPTION OF THE PREFERRED EMBODIMENTS

The present invention describes the synthesis of a free-standing interpenetrating polymer network (IPN) film which is mechanically stable in both the dry and hydrated states, is a good hydrogen ion conductor when hydrated, and is selectively permeable to water while simultaneously being sparingly permeable to methanol. An inventive film has utility as a polymer electrolyte membrane (PEM).

While the present invention is detailed with respect to a PEM, it is appreciated that an inventive film is also operative in other electrochemical systems requiring a solid polymer electrolyte, illustratively including a lithium ion-conducting solid polymer electrolyte; selective membranes used as molecular sieves for filtration, purification, or accumulation and concentration of various analytes such as proteins; and as a microencapsulant for drug therapies where selectivity and/or controlled release or exposure to drugs, ions, buffers or immunoglobulins is desirous. Additionally, it is appreciated that an inventive film is readily derivatized with an adherent to contain a catalyst, a specific binding or recognition moiety for a target analyte, thereby affording sensing and/or accumulation of target analytes, illustratively including proteins, cells, carbohydrates, antigens, and environment pollutants.

An inventive film is prepared by independently cross-linking a first polymer and a second polymer to form an interpenetrating polymer network (IPN). In the case where an inventive film is utilized as a PEM, the first polymer is chosen for proton conductivity and the second polymer for low methanol permeability such that the resulting material is selectively permeable to water and is a proton conductor.

A first polymer operative in the present invention is chosen for proton conductivity and is derived from a monomer having the general structure

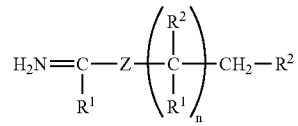

where $R^1$ is independently in each occurrence H, $C_1$–$C_4$ alkyl, $C_1$–$C_4$ hydroxy alkyl, Cl or Br; Z is a nullity, O, $C(O)NR^3$ or $C(O)$; $R^2$ is independently in each occurrence H, $C_1$–$C_4$ alkyl, $C_1$–$C_4$ hydroxy alkyl, $C_0$–$C_4$ $SO_3M$ or $C_0$–$C_4$ $PO_2H_2$; $R^3$ is H, $C_1$–$C_4$ alkyl, $C_1$–$C_4$ hydroxy alkyl, where M is H, Li, Na, K, Zn, Mg, Ca, Ba, Sr, Cs and Al; n is an integer from 1 to 5, inclusive, with the proviso that adjacent carbon atoms lack sulfonic and/or phosphonic acid groups and at least one sulfonic acid or phosphonic acid group is present in the structure.

Among the specific monomers represented by the above structure are 2-acrylamido-2-methyl propane sulfonic acid, acryl ethane sulfonic acid, methacryl ethane phosphonic acid, 2-methacrylamido-N-ethyl sulfonic acid, and methacryl-2-hydroxyethane sulfonic acid. Typical dry weight percentages of the first polymer in an inventive IPN range is from 2 to 40 total weight percent. Preferably, the first polymer is present from 2 to 10 total weight percent of an inventive IPN.

According to the present invention, hydrophilic acid containing monomers are used as PEM components. 2-acrylamido-2-methylpropanesulfonic acid (AMPS) monomer is utilized based on it containing a sulfonic acid group in its chemical structure and on published work that follows herein, where it was prepared as a proton-conductive gel used in electrochromic devices. (K. C. Ho, T. G. Rukavina and C. B. Greenberg. *J. Electrochem. Soc.* 141 (1994) 2061; J. P. Randin. *J. Electrochem. Soc.* 129 (1982) 1215; J. M. Calvert, T. J. Manuccia and R. J. Nowak. *J. Electrochem. Soc.* 133 (1986) 951; R. D. Giglia, J. A. Sedlak and D. W. Lipp. U.S. Pat. No. 4,174,152, Nov. 13, 1979; R. D. Giglia and S. Y. Huang. U.S. Pat. No. 4,375,318, Mar. 1, 1983; R. D. Giglia. U.S. Pat. No. 4,478,991, Oct. 23, 1984; J. P. Randin. U.S. Pat. No. 4,296,016, Oct. 20, 1981; R. D. Giglia, U.S. Pat. No. 4,488,781, Dec. 18, 1984; M. C. Bernard, A. H. L. Goff and W. Zeng. *Electrochimica Acta* 44 (1998) 781). It has also been used as the basis for a humidity sensor (Y. Sakai, M. Matsuguchi and N. Yonesato. *Electrochimica Acta* 46 (2001) 1509) and as a lithium ion conducting polymer electrolyte in a lithium battery (J. T. Sejdic, R. Steiner, J. Desilvestro and P. Pickering. *Electrochimica Acta* 46 (2001) 1461). Conductivity of semi-solid poly-AMPS was found to be higher than that of partially hydrated Nafion® that was hydrated to 15 water molecules per sulfonic acid group. (J. P. Randin. *J. Electrochem. Soc.* 129 (1982) 1215) By contrast, conductivity of poly-AMPS increases with water content only until about 6 molecules per equivalent and then levels off. (J. P. Randin. *J. Electrochem. Soc.* 129 (1982) 1215) Poly-AMPS and AMPS-containing copolymers have been used in ion-conducting electrolytes, particularly in electrochromic displays, as a viscous paste, tacky film, semi-solid gel and solid electrolyte film. Even in cases where solid films were prepared, they were usually formed by depositing the liquid polymer on the device and evaporating the solvent. In contrast, the present invention produces a free-standing film that can be repeatedly dried and rehydrated to contain a substantial amount of water (which is desired for ion conductivity), that also is rugged enough to be handled and processed, positioned, modified, cut, or shaped in the manufacture of a device. Because numerous acid containing monomers, including AMPS homopolymers, only yield gels, the present invention relies on extensive cross-linking or introduction of a copolymer to produce a suitable proton conductive polymer film. As used herein, "cross-linking" is defined to mean attachment of two chains of polymer molecules by bridge species which form a covalent linkage between the two chains. By choosing a suitable copolymer, and with cross-linking, it is possible to control methanol permeability, permitting its use in DMFCs.

In order to modify the properties of the resulting polymer, the proton conductive first polymer monomer is optionally copolymerized with a copolymer monomer. The function of the copolymer within the present invention in combination with the proton conductive first polymer is to impart insolubility in water of the complete copolymer and to provide mechanical stability. A copolymerization monomer, when present, typically represents 10 to 85 total weight percent of the resulting dry inventive IPN film. It is recognized that many other monomers are operative herein, these other monomers illustratively include 2-hydroxy ethyl methacrylate, hydroxypropyl methacrylate, 4-hydroxybutyl methacrylate, 2-hydroxyethyl acrylate, 2-hydroxypropyl acrylate, methyl methacrylate, N-t-butylacrylamide, N,N'-dimethylacrylamide, (vinyl)sulfonic acid, styrene, styrenesulfonic acid, as well as many other acrylamides, acrylates, hydroxyalkyl acrylates and methacrylates. A preferred copolymer for AMPS is 2-hydroxyethyl methacrylate (HEMA), generally in the weight percent range of 20 wt. % to 75 wt. % of the total polymer composition.

The foregoing first polymer monomers, copolymer monomers, and cross-linking agents need not be in the pure state, but may comprise commercial grades in which inhibitors or stabilizers, such as polyhydric phenols, quinones, and the like are included. These materials function as free radical inhibitors to prevent premature polymerization. It is also within the scope of the present invention to obtain modified characteristics for the cured composition by utilization of one or more monomers either from those listed above or additional additives such as unsaturated monomers, including unsaturated hydrocarbons and unsaturated esters.

Curing or cross-linking is initiated by various methods conventional to the art. These illustratively include subjecting the monomers to ultraviolet radiation, an electron beam source, elevated temperatures of from about 50° C. to about 80° C. in an inert atmosphere alone or in the presence of a polymerization initiator. Preferably, the compositions of the present invention include a polymerization initiator which initiates or otherwise promotes the polymerization of the first polymer monomer alone or in combination with a copolymer monomer. Free radical polymerization initiators operative herein illustratively include 2,2'-azobisisobutyronitrile (AIBN) and 2,2'-azobis(2,4-methylvaleronitrile). The preferred free radical polymerization initiator in the cross-linking reactions between AMPS-HEMA and EGDM is 2,2'-azobisisobutyronitrile (AIBN). AIBN is typically present in a weight percent range of 1% to 20% with respect to the AMPS first polymer-HEMA copolymer composition, and preferably present from 1 to 3 wt. %. In the case of anaerobic cures or cross-linking, peroxy initiators are generally employed. Other free radical promoters and initiators, metal catalysts and the like, may be employed suitable to the chosen monomer and/or polymerizable composition.

The peroxy initiators useful in anaerobic cure compositions of the present invention include the hydroperoxy polymerization inhibitors and most preferably the organic hydroperoxide inhibitors having the formula ROOH, where R generally is a hydrocarbon radical containing up to about 18 carbons, desirably an alkyl, aryl or aralkyl radical containing up to about 12 carbon atoms. Typical examples of such hydroperoxides include cumene hydroperoxide, methylethylketone hydroperoxide as well as hydroperoxides formed by the oxygenation of various other hydrocarbons such as methylbutene, cetane and cyclohexane. Other peroxy initiators such as hydrogen peroxide or materials such as organic peroxides or peresters which hydrolyze or decompose to form hydroperoxides may also be employed.

The preferred solvents employed in the polymerization of the above mentioned preferred components are a mixture ethyl alcohol, methyl alcohol and deionized water, usually in a volume ratio ranging from 25:25:5 to 50:50:5 respectively. However, other alkyl alcohols, N,N-dimethylformamide, tetrahydrofuran, dimethyl sulfoxide, and other appropriate solvents are readily substituted or added thereto.

A second polymer of an inventive IPN operates as a selective barrier to methanol. The second polymer illustratively includes polyvinyl alcohol (PVA), and ethyl vinyl alcohol (EVA) alone or in combination. Preferably PVA is 88% to 99% hydrolyzed poly(vinyl alcohol) (PVA), with average MW 85,000–146,000, although PVA of other molecular weight and extent of hydrolysis is also operative herein. The amount of second polymer is typically from 10 to 80 total weight percent of a dry IPN film. The preferred weight percent PVA in a total AMPS-HEMA polymer composition ranges from 24% to 75%. The preferred cross-linking agent for the condensation reaction that cross-links PVA is glutaric dialdehyde (glutaraldehyde), also employing hydrochloric acid as a catalyst for this reaction. The cross-linking solution in which the membrane is immersed generally contains 5% or less glutaric dialdehyde, with 1% being preferred. Other second polymer cross-linking agents illustratively include succinic anyhdride and hexamethylene diisocyanate. Immersion in a cross-linking solution is a preferred method of producing a homogeneous cross-linking of the second polymer. By exposing only one face of the IPN to a PVA cross-linking agent, a cross-linked gradient is created with very low methanol permeability on one surface of the membrane that diminishes while moving towards the opposite face of the membrane. A graded cross-linkage density is appreciated to be especially useful in the context of molecular separation science. By carefully controlling the concentration of the cross-linking agent and time of reaction, a film that is highly cross-linked only at one surface could be created. In this manner, a highly selective membrane would be created, with the bulk of the membrane retaining the ability to adsorb large amounts of water and thus preserve the property of good ion conductivity. This gradient cross-linking technique with PVA has been demonstrated by Dai and Barbari (W. S. Dai and T. A. Barbari. *J. Membrane Sci.* 156 (1999) 67, "Hydrogel membranes with mesh size asymmetry based on the gradient crosslinking of poly(vinyl alcohol)").

Properties of an inventive IPN film also are altered by the order in which the cross-linking reactions are performed. For example, cross-linking of the first polymer-copolymer by free radical polymerization is followed by cross-linking of the second polymer by a condensation reaction, or vice versa.

Other materials are optionally added to the polymerizable monomers. Inventive polymerizable compositions typically employ stabilizers, accelerators, thickeners, coloring agents and the like in suitable amounts for their intended purposes.

Inhibitors well recognized in the art for imparting stability to polymerizable compositions are optionally added. Those inhibitors useful in the present composition may be selected from any of the known inhibitors including those selected from hydroquinones, benzoquinones, naphthoquinones, phenanthraquinones, anthraquinones, and substituted compounds of any of these. Inhibitors are effectively employed in levels of about 0.1 to about 1% by weight of the monomer, without adversely affecting the speed of cure of the inventive IPN film.

Thickeners, plasticizers, pigments, dyes, diluents, fillers, and other agents common to the art are optionally employed in any reasonable manner to produce desired functional characteristics, providing they do not significantly interfere with the monomer polymerization. Inorganic salt hydrates, silica particulate, metal sols and organic molecule passivated nanocrystals of metal or semiconductor materials are non-limiting examples of fillers of an inventive IPN film.

The homogeneous blend of inventive IPN components is then cast upon a suitable casting surface which may consist of any suitable material sufficiently smooth in nature so as to provide a surface free of any defects which may cause imperfections on the surface of the membrane. Examples of suitable casting surfaces may include metals such as stainless steel, aluminum, etc., glass, polymer or ceramics. After casting the solution upon the surface, the solvent is then removed by any conventional means including natural evaporation or forced evaporation by the application of elevated temperatures whereby said solvent is evaporated and the desired membrane comprising a thin film is formed. Film evaporation may be effected at room temperature over a period of time ranging up to about 24 hours or by subjecting the film to elevated temperatures up to about 40° C. for a shorter time. Evaporation may also be effected by subjecting the solution to reduced pressure as low as 10 mm Hg at ambient or elevated temperatures. The thickness of the film can be controlled by the amount of phosphoric or sulfuric acid and/or polymer which is present in the reaction mixture or by the depth of the casting vessel. The thin film membrane which is prepared according to the process of the present invention will possess a thickness which may range from about 0.1 to over 500 microns and preferably from about 20 to about 100 microns.

The following examples are given for the purpose of illustrating various embodiments of the invention and are not meant to limit the present invention in any fashion.

EXAMPLE 1

An inventive IPN film nominally designated as 4% AMPS—21% HEMA—75% PVA is prepared as follows. A mixture of 40 ml of ethanol, 40 ml of methanol, and ml deionized water is deaerated by bubbling nitrogen gas while stirring. While continuing to slowly bubble nitrogen and with stirring, 0.08 g AMPS is dissolved into solution, followed by 0.39 ml of HEMA, 0.05 ml EGDM, and 0.014 g AIBN. The solution is refluxed for 9 h at 60° C. with continuous stirring and slow bubbling of nitrogen, then allowed to cool to room temperature. 10 ml of deionized water that had been deaerated with nitrogen is added, followed by 30 ml of a 5% aqueous solution of 96% hydrolyzed PVA (prepared by dissolving 1.5 g PVA in 30 ml of deionized water with the aid of a boiling water bath). The solutions are stirred while bubbling nitrogen, then solution cast in an open glass petri dish. Solvents are allowed to evaporate in a fume hood for at least two days. The dry film is peeled from the glass dish, then returned to the dish and placed in a 70° C. dry air oven for 24 h to initiate free radical cross-linking of the AMPS-HEMA copolymer. After cutting the film in half, the condensation reaction cross-linking the PVA is performed by immersing one film in a 1% solution of glutaric dialdehyde (glutaraldehyde) also containing 0.1 N HCl to catalyze the reaction. The second film is soaked in a 5% glutaric dialdehyde solution containing 0.1 N HCl. After soaking for 20 minutes, each film is thoroughly soaked and rinsed in several changes of distilled water for 20 minutes, blotted dry, and allowed to air dry.

In the dry state, the inventive IPN film is very flexible following solution casting. Cross-linking reduces flexibility, but the membranes generally remain fairly flexible without cracking or breaking. Flexibility decreases as the percentage of PVA in the IPN is reduced. When hydrated, the IPN film is extremely flexible and pliable. A rehydrated IPN film is generally on the order of 0.01 to 0.035 cm in thickness.

Figure 1:
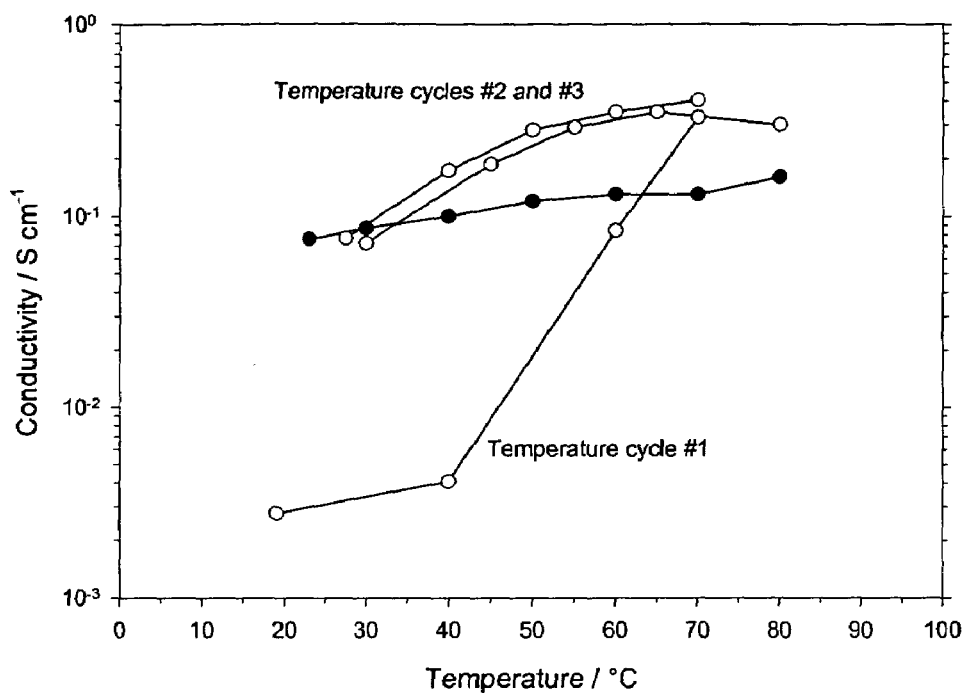
FIG. 1 is a plot of conductivity as a function of temperature for three heating cycles for 4% AMPS—21% HEMA—

Ionic conductivity as a function of temperature for this inventive IPN is shown in FIG. 1, and is compared to Nafion®. During the first set of measurements, conductivity between 20° C. and 40° C. is low compared to Nafion®. However, when the temperature is increased to 60° C., conductivity increased dramatically to nearly the same value as measured for Nafion®. At 70° C., conductivity of the inventive film is much higher than that of Nafion®. The temperature of the test fixture and membrane is reduced to 30° C. overnight, and measurements repeated. During this second temperature cycle, conductivity of the inventive film is approximately that of Nafion® at 30° C., but exceeded Nafion® at temperatures above 30° C. A third temperature cycle showed a similar result.

EXAMPLE 2

An inventive IPN film composed of 4% AMPS—21% HEMA—75% PVA is synthesized in a manner similar to Example 1, except the PVA is only 88% hydrolyzed and only 1% glutaraldehyde is used in the cross-linking reaction. Other modifications are the use of ethanol, methanol and distilled water in the ratio of 25 ml: 25 ml: 5 ml, EGDM and AIBN used in the amounts of 13 wt % and 3 wt % respectively, and omitting the water that is added to the AMPS-HEMA solution prior to addition of the appropriate amount of aqueous PVA solution.

Conductivity as a function of temperature for the inventive IPN film prepared in Example 2 is shown in FIG. 2. A similar effect on conductivity with temperature cycling is seen as observed for Example 1, where conductivity increases significantly at temperatures above 40° C. on the first cycle, but remains as high or higher than Nafion® on at all temperatures on subsequent cycles. Selectivity for methanol is measured to be 0.48 as shown in FIG. 6 and given in Table 1.

EXAMPLE 3

An inventive IPN film composed of 4.6% AMPS—39.6% HEMA—55.8% PVA IPN is prepared in a manner similar to Example 2 with the following modifications. The PVA is 96% hydrolyzed, and 11.3 wt % EGDM and 2.6 wt % AIBN are used. The order of performing the cross-linking reactions is also altered. One piece of the cast film is cross-linked by the previously described method; first at 70° C. overnight followed by cross-linking in 1% glutaraldehyde. The remaining piece of film is first cross-linked by soaking in 1% glutaraldehyde containing 0.1 N HCl, rinsed in water and dried, followed by cross-linking at 70° C. When cross-linking in glutaraldehyde follows cross-linking at 70° C., the film becomes soft during cross-linking in the glutaraldehyde solution but remains intact during handling. If treatment in glutaraldehyde occurs before heating at 70° C., the film in the glutaraldehyde solution becomes fragile and requires gentle handling. After treating at 70° C. this inventive IPN film appears to be more brittle than the inventive films of Examples 1 and 2. Adsorption of water and methanol by these two films is given in Table 1. The film first treated in glutaraldehyde shows much lower adsorption of methanol than the film first treated at 70° C. Water adsorption was approximately the same for both samples. Consequently, selectivity for methanol is improved (lower) when cross-linking of PVA precedes cross-linking of AMPS-HEMA.

Conductivity as a function of temperature for the IPN first cross-linked at 70° C. and then in glutaraldehyde in Example 3 is shown in FIG. 3, where at 60° C. and above, the conductivity is approximately equal to that of Nafion®. Unlike the films of Examples 1 and 2, no dramatic change in conductivity is seen with temperature cycling.

EXAMPLE 4

A 10% AMPS—20% HEMA—70% PVA IPN is synthesized in a manner similar to Example 3 with the exception of containing 10 wt % EGDM and 2.7 wt % AIBN.

Conductivity as a function of temperature for the inventive IPN film of Example 4 is given in FIG. 4. Results are similar to those of the IPN of Example 3, but there is a slight effect with temperature cycling seen for temperatures below 60° C. Solvent adsorption and selectivity for methanol are given in Table 1.

EXAMPLE 5

A 4% AMPS—72% HEMA—24% PVA IPN is synthesized in a manner similar to Example 3 with the exception of containing 2.8 wt % EGDM and 0.8 wt % AIBN, and having the ratio of ethanol, methanol, and water being 40 ml: 40 ml: 5 ml; and 10 ml of nitrogen-deaerated water added to the to the AMPS-HEMA solution prior to addition of the aqueous PVA solution. The dry polymer had a grainy appearance and is more adherent to the glass casting dish than the films of the preceding Examples 1–4.

The trend for conductivity of the inventive IPN film prepared herein is similar to that of Example 2. In FIG. 5, the initial conductivity of this film at temperatures below 60° C. is low when compared to Nafion®, but is comparable or exceeds that of Nafion® at 60° C. and above. The second temperature cycle shows conductivity equal or greater than that of Nafion® at all temperatures measured. Solvent adsorption and selectivity for methanol are given in Table 1.

EXAMPLE 6

A 4% AMPS—21% HEMA—75% PVA IPN is synthesized in a manner similar to Example 1, with the exception of containing 99% hydrolyzed PVA subsequently cross-linked in 1% glutaraldehyde.

Solvent adsorption and selectivity for methanol for this inventive film are given in Table 1 and FIG. 6.

The effect of percent hydrolysis of PVA is evident in comparing results for adsorption of water and methanol of Table 1 and FIG. 6 with the observed trend that for the composition ratio of 4% AMPS—21% HEMA—75% PVA, as the percent of hydrolysis of PVA increases, methanol permeability decreases, as does selectivity for methanol.

In FIG. 6, weight percent adsorption of water and methanol, based on weight of adsorbed solvent divided by weight of dry membrane, by both IPN membranes prepared in Example 1 are shown along with Nafion and IPNs from Examples 2 and 6. Nafion® adsorbs 2.4 times more methanol by weight than water. In contrast, the four IPNs shown all adsorb significantly more water than methanol. Defining selectivity for methanol as weight percent adsorbed methanol divided by weight percent adsorbed water, selectivity of Nafion® is 2.4, while selectivity of the IPNs prepared in Example 1 ranges from 0.60 for PVA cross-linked with 5% glutaraldehyde down to 0.31 when cross-linked with 1% glutaraldehyde. These results are also given in Table 1 where the best selectivity of 0.26 is observed for 99% hydrolyzed PVA. Although methanol adsorption was approximately the same for both 1% and 5% glutaraldehyde-cross-linked films, the 5% cross-linked film was significantly less permeable to water. Assuming the 5% glutaraldehyde solution reacts more extensively with the PVA than the 1% solution, the increased cross-linking apparently decreased pore size and restricted the ability of the IPN to swell and adsorb water. Additionally, cross-linking with 5% glutaraldehyde was deleterious to the mechanical integrity of the IPN since these films seemed to tear easily after immersion for several days in both water and in neat methanol. The contact time between the glutaraldehyde solution and IPN will also determine the extent of cross-linking.

TABLE 1

Weight percent solvent adsorption, methanol selectivity, and ionic conductivity for various polymer systems designated by weight percent of AMPS, HEMA, and PVA with percent hydrolysis of PVA in parenthesis.

| Polymer | Water Adsorbed (wt %) | Methanol Adsorbed (wt %) | Methanol Selectivity* | Conductivity at 60° C. (S cm$^{-1}$) |
|---|---|---|---|---|
| Nafion | 23.7 | 56.8 | 2.40 | $1.30 \times 10^{-1}$ |
| 4-21-75 (88) | 124.3 | 60.1 | 0.48 | $2.95 \times 10^{-1}$ |
| 4-21-75 (96)$^a$ | 139.3 | 43.4 | 0.31 | $3.49 \times 10^{-1}$ |
| 4-21-75 (96)$^b$ | 71.7 | 43.0 | 0.60 | ND |
| 4-21-75 (99) | 119.7 | 31.3 | 0.26 | ND |
| 4.6-39.6-55.8 (96)$^c$ | 128.6 | 37.4 | 0.29 | ND |
| 4.6-39.6-55.8 (96)$^d$ | 134.7 | 60.3 | 0.45 | $1.02 \times 10^{-1}$ |
| 4-72-24 (96) | 101.6 | 59.8 | 0.59 | $2.60 \times 10^{-1}$ |
| 10-20-70 (96) | 141.7 | 53.2 | 0.38 | $1.14 \times 10^{-1}$ |

ND—not determined
*Selectivity is defined as wt % adsorbed methanol divided by wt % adsorbed water.
$^a$cross-linked with 1% glutaraldehyde
$^b$cross-linked with 5% glutaraldehyde
$^c$treated with 1% glutaraldehyde followed by treatment at 70° C.
$^d$treated at 70° C. followed by treatment with 1% glutaraldehyde Patents and publications mentioned in the specification are indicative of the levels of those skilled in the art to which the invention pertains. These patents and publications are incorporated herein by reference to the same extent as if each individual patent or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A water-insoluble interpenetrating polymer network comprising:

a first polymer derived from a monomer having the general structure

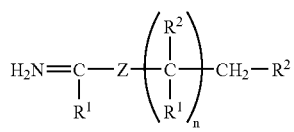

where $R^1$ is independently in each occurrence H, $C_1$–$C_4$ alkyl, $C_1$–$C_4$ hydroxy alkyl, Cl or Br; Z is a nullity, O, $C(O)NR^3$ or $C(O)$; $R^2$ is independently in each occurrence H, $C_1$–$C_4$ alkyl, $C_1$–$C_4$ hydroxy alkyl, $C_0$–$C_4$ $SO_3M$ or $C_0$–$C_4$ $PO_2H_2$; $R^3$ is H, $C_1$–$C_4$ alkyl, $C_1$–$C_4$ hydroxy alkyl, where M is H, Li, Na, K, Zn, Mg, Ca, Ba, Sr, Cs and Al; n is an integer from 1 to 5, inclusive, with the proviso that adjacent carbon atoms lack sulfonic and/or phosphonic acid groups and at least one sulfonic acid or phosphonic acid group is present in the structure;

a second monomer copolymerized with said monomer to impart water insolubility to said first polymer; and a second polymer polymerized independently of said first polymer and interpenetrating said first polymer wherein said second polymer is more permeable to water than methanol.

2. The interpenetrating polymer network of claim 1 wherein said monomer has a sulfonic acid group.

3. The interpenetrating polymer network of claim 1 wherein Z is $C(O)NR^3$.

4. The interpenetrating polymer network of claim 1 wherein said monomer has only a single sulfonic acid or phosphonic acid group.

5. The interpenetrating polymer network of claim 1 wherein said monomer is selected from a group consisting of: 2-acrylamido-2-methyl propane sulfonic acid, acryl ethane sulfonic acid, methacryl ethane phosphonic acid, 2-methacrylamido-N-ethyl sulfonic acid, and methacryl-2-hydroxyethane sulfonic acid.

6. The interpenetrating polymer network of claim 1 wherein said monomer is 2-acrylamido-2-methyl propane sulfonic acid.

7. The interpenetrating polymer network of claim 1 wherein said first polymer is present from 2 to 40 total weight percent.

8. The interpenetrating polymer network of claim 1 wherein said second monomer is selected from a group consisting of: 2-hydroxy ethyl methacrylate, hydroxypropyl methacrylate, 4-hydroxybutyl methacrylate, 2-hydroxyethyl acrylate, 2-hydroxypropyl acrylate, methyl methacrylate, N-t-butylacrylamide, N,N'-dimethylacrylamide, (vinyl)sulfonic acid, styrene, and styrenesulfonic acid.

9. The interpenetrating polymer network of claim 1 wherein said second monomer is present from 20 to 75 total weight percent.

10. The interpenetrating polymer network of claim 1 wherein said monomer is present at a lesser weight percent than said second monomer.

11. The interpenetrating polymer network of claim 1 further comprising a cross-linking agent.

12. The interpenetrating polymer network according to claim 1 further comprising a polymerization initiator.

13. The interpenetrating polymer network of claim 11 wherein said cross-linking agent is selected from a group consisting of: ethylene glycol dimethacrylate (EGDM), ethylene glycol diacrylate, tetraethylene glycol diacrylate, tetraethylene glycol dimethacrylate, poly(ethylene glycol) diacrylate, poly(ethylene glycol) monomethacrylate, propylene glycol diglycidyl ether, N,N'-methylene-bis-acrylamide, and 3,3-tetramethyleneglutaric acid.

14. The interpenetrating polymer network of claim 1 wherein said second polymer is polyvinyl alcohol.

15. The interpenetrating polymer network of claim 14 further comprising a condensation reaction cross-linking agent.

16. The interpenetrating polymer network of claim 15 wherein said polyvinyl alcohol is uniformly cross-linked.

17. The interpenetrating polymer network of claim 15 wherein a cross-link density gradient exists within said polyvinyl alcohol.

18. The interpenetrating polymer network of claim 1 further comprising a filler selected from the group consisting of: inorganic salt hydrates, silica particulate, metal sols, metal nanocrystals, and semiconductor nanocrystals.

19. A film produced from an interpenetrating polymer network of claim 1.

20. The film of claim 19 having proton conductivity and greater permeability to water than methanol.

21. The film of claim 19 having a first surface in contact with an adherent selected from the group consisting of: a catalyst, a specific binding moiety for a target analyte, and a recognition moiety for a target analyte.

22. A water-insoluble interpenetrating polymer network comprising:

a first polymer derived from a monomer having the general structure

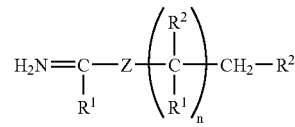

where $R^1$ is independently in each occurrence H, $C_1$–$C_4$ alkyl, $C_1$–$C_4$ hydroxy alkyl, Cl or Br; Z is a nullity, O, $C(O)NR^3$ or $C(O)$; $R^2$ is independently in each occurrence H, $C_1$–$C_4$ alkyl, $C_1$–$C_4$ hydroxy alkyl, $C_0$–$C_4$ $SO_3M$ or $C_0$–$C_4$ $PO_2H_2$; $R^3$ is H, $C_1$–$C_4$ alkyl, $C_1$–$C_4$ hydroxy alkyl, where M is H, Li, Na, K, Zn, Mg, Ca, Ba, Sr, Cs and Al; n is an integer from 1 to 5, inclusive, with the proviso that adjacent carbon atoms lack sulfonic and/or phosphonic acid groups and at least one sulfonic acid or phosphonic acid group is present in the structure; and a second polymer polymerized independently of said first polymer and interpenetrating said first polymer wherein said second polymer is more permeable to water than methanol;

wherein said first polymer is present from 2 to 40 total weight percent.

23. The interpenetrating polymer network of claim 22 wherein said monomer has only a single sulfonic acid or phosphonic acid group.

24. The interpenetrating polymer network of claim 22 wherein said monomer is selected from a group consisting of: 2-acrylamido-2-methyl propane sulfonic acid, acryl ethane sulfonic acid, methacryl ethane phosphonic acid, 2-methacrylamido-N-ethyl sulfonic acid, and methacryl-2-hydroxyethane sulfonic acid.

25. The interpenetrating polymer network of claim 22 wherein said second polymer is polyvinyl alcohol.

26. The interpenetrating polymer network of claim 25 further comprising a condensation reaction cross-linking agent.

27. The interpenetrating polymer network of claim 22 further comprising a filler selected from the group consisting of: inorganic salt hydrates, silica particulate, metal sols, metal nanocrystals, and semiconductor nanocrystals.

* * * * *